United States Patent [19]

Vaniglia

[11] Patent Number: 5,110,395
[45] Date of Patent: May 5, 1992

[54] FIBER PLACEMENT HEAD

[75] Inventor: Milo M. Vaniglia, Southgate, Ky.

[73] Assignee: Cincinnati Milacron Inc., Cincinnati, Ohio

[21] Appl. No.: 445,201

[22] Filed: Dec. 4, 1989

[51] Int. Cl.$^5$ .............................................. B26D 5/20
[52] U.S. Cl. ..................... 156/353; 156/175; 156/425; 156/433; 156/441; 156/523
[58] Field of Search ............... 156/433, 523, 175, 441, 156/425, 353

[56] References Cited

U.S. PATENT DOCUMENTS

| | | |
|---|---|---|
| 3,146,926 | 9/1964 | Huffman et al. |
| 3,363,849 | 1/1968 | McLarty |
| 3,378,427 | 4/1968 | McClean |
| 3,616,078 | 10/1971 | Howard |
| 3,775,219 | 11/1973 | Karlson |
| 3,853,282 | 12/1974 | Wentworth |
| 3,909,600 | 9/1975 | Hohn |
| 4,273,601 | 6/1981 | Weingart |
| 4,292,108 | 9/1981 | Weiss et al. |
| 4,324,607 | 4/1982 | Dugger |
| 4,419,170 | 12/1983 | Blad |
| 4,699,683 | 10/1987 | McCowin ........................ 156/353 |
| 4,790,898 | 12/1988 | Woods ........................ 156/441 |
| 4,822,444 | 4/1989 | Weingart et al. ............... 156/441 |
| 4,867,834 | 9/1989 | Alenskis et al. ................ 156/433 |
| 4,869,774 | 9/1989 | Wisbey |
| 4,872,619 | 10/1989 | Vaniglia |
| 4,877,193 | 10/1989 | Vaniglia |

FOREIGN PATENT DOCUMENTS 1569166 6/1969 Australia .

OTHER PUBLICATIONS

Fiber Placement Process Study, by D. Evans, M. Vaniglia, P. Hopkins Published in SAMPE 34th Symposium Book of Proceeding, May 8-11, 1989.
Cincinnati Milacron company newspaper "Milacron Today"-vol. 4, No. 6, Jun., 1989.
American Machinist, Sep. 1989, p. 27 "Composite Shapes by Tow Placement".

*Primary Examiner*—Caleb Weston
*Assistant Examiner*—Francis Lorin
*Attorney, Agent, or Firm*—Thomas Farrell; Thomas L. Kautz

[57] ABSTRACT

A fiber placement head for a fiber placement machine of the type in which a number of individual resin-impregnated fiber tows or "towpregs" are fed at independent rates from a creel assembly for application as a fiber band onto the surface of a mandrel includes cooling chutes for each fiber tow which reduces their temperature to reduce the tack of the tows. A cut, clamp and restart mechanism is provided wherein the cutting and clamping operations are performed by a unitary knife blade and clamping block, and the restart or rethreading of cut tows is obtained by the engagement of a pinch roller with a continuously rotating rethread shaft which are operative independently of the movement of the fiber placement head relative to the mandrel. The tows are pressed or compacted onto the mandrel by a compaction shoe, and feed and rewind rollers are provided to interpose a protective film between the compaction shoe and fiber band to avoid damage to the tows.

14 Claims, 12 Drawing Sheets

FIBER PLACEMENT HEAD

FIELD OF THE INVENTION

This invention relates to fiber placement machines and, more particularly, to a fiber placement head capable of laying down a number of composite fiber tows side-by-side onto a tool or form having a complex shape.

BACKGROUND OF THE INVENTION

The use of reinforced plastics or composites in the fabrication of structural components has grown substantially in recent years. Composite structures are formed by overlapping layers of a "towpreg", i.e., reinforcement material such as graphite fiber impregnated with a matrix material such as epoxy. Composite structures have become increasingly popular as a replacement for metallic parts, particularly in high performance applications such as in the aircraft industry, because of the high strength to weight ratio, good corrosion resistance, good impact resistance, and high electrical and thermal resistance exhibited by composite parts.

One aspect of the composites industry which has restricted the use of composite parts in some applications is that traditionally many composite parts had to be fabricated by hand or with several manual operations. The technology of automating the formation of composite parts continues to evolve, but limitations still exist particularly in the formation of parts having a relatively complex shape, i.e., parts having contoured or arcuate surfaces as opposed to cylindrical or other standard shapes.

Early attempts to automate the formation of composite parts involved the use of filament winding machines employing a wet winding technique in which fibers of filamentary material are drawn through a resin bath mounted on a traversing carriage having a pay-out eye. A form or tool, carried on a rotating mounting structure, is located with respect to the carriage such that the resin impregnated fibers are guided under tension by the pay-out eye longitudinally along the rotating tool. The pay-out eye traverses the tool from end to end laying down successive layers of fibers until the desired wall thickness is built up on the tool. The resin or matrix material is cured on the tool, and then the tool is removed leaving the cured, wound composite structure. See, for example, U.S. Pat. Nos. 3,378,427; 3,146,926 and 3,363,849.

One advantage of filament winding machines is that the pay-out eye can be oriented with respect to the tool such that the fibers are laid down at various angles relative to the longitudinal axis of the tool. This permits the formation of a finished composite part in which the several layers of fibers forming the wall of the part are oriented in the direction in which the part will be loaded, thus providing maximum strength with minimum wall thickness. Despite this and other advantages, a number of problems or limitations are presented by current filament winding techniques. For example, in the formation of cylindrical shaped objects, the continuous fibers traverse the tool longitudinally from end to end to form the individual layers of the wall of the part. This produces a buildup of fibers at the ends of the part, compared to the center section thereof, which wastes fiber material at the ends of the part if it is not needed there.

Another problem with conventional filament winding machines relates to "compaction pressure", i.e., the pressure with which the fibers are applied onto the surface of a tool. The fibers are guided through a pay-out eye in filament winding machines and are applied to the surface of the tool under tension. The compaction pressure is dependent upon the tension on the fiber, the curvature of the surface of a tool and the width of the fibers. Tools having complex shapes such as arcuate or contoured surfaces with "peaks and valleys", i.e., concave and convex areas located adjacent one another along the winding axis, present problems for filament winding machines because the tension wound fibers span the concave surface adjacent a convex area. This is because no means are provided to press or compact the fibers directly into the concave area. The lack of direct compaction pressure between the fibers and tool surface in filament winding machines also creates problems in the winding of box-shaped parts. Because the compaction pressure is dependent, in part, on the curvature of the tool surface, the fibers are laid down on the flat sides of the box with little or no compaction whereas the corners of the box are highly compacted. The box-shaped part is thus unevenly compacted by filament winding machines, and has a thinner wall thickness around the corners than the sides.

The problem of automatically forming more complex composite parts has been solved to some extent by tape laying machines such as disclosed, for example, in U.S. Pat. Nos. 3,616,078; 4,822,444; 4,273,601; 3,775,219; 4,292,108; and 4,419,170. Machines of this type lay down a relatively wide "tape" which is essentially a pre-impregnated group of continuous individual fibers oriented parallel to one another on a carrier material. These tapes are carried in a placement head supported by structure capable of manipulating the placement head relative to a tool or form about a number of axes. Unlike filament winding devices, tape laying machines are capable of accommodating more complex shaped parts because the fibers in the tape are pressed or compacted directly onto the tool by a compaction roller or shoe carried on the placement head. The mechanisms which carry the placement head are effective to maintain the roller or shoe substantially perpendicular to the surface of the tool such that the tape is pressed against non-planar surfaces of the tool. As a result, tape laying machines are more versatile than filament winding apparatus for large, gently contoured parts and have been effective in automating the production of some parts which had previously been constructed entirely by hand or with a number of hand lay up operations.

While tape laying machines have provided an advance in the fabrication of composite parts, such machines also have limitations. One problem involves an unwanted buildup of composite layers at the small ends of a tapered tool and similar parts. There is no provision in tape laying machines for decreasing the numbers of fibers within the tape as the placement head reaches the smaller ends of a tapered tool, for example, and therefore more fiber material can be built up on the ends than the center of the tool.

Another problem with tape laying machines is that they are incapable of laying down the tape along an arcuate or curved path except where the arc or angle of the path is extremely large. As mentioned above, the tape consists of fibers oriented parallel to one another on a carrier material. If the placement head of the tape laying machine is moved in an arcuate path, the tape tends to wrinkle or buckle because all of the fibers in the tape are of the same length. In order for a tape laying machine to accommodate arcuate paths, the fibers along one edge of the tape must subtend a different length than those on the opposite edge so that the tape conforms to such an arcuate path. Variation in the length of the fibers within the tape is not possible in currently available tape laying machines.

A third generation of automated devices for the fabrication of composite parts is disclosed, for example, in U.S. Pat. No. 4,699,683 to McCowin. Apparatus of the type disclosed in the McCowin patent are referred to as "fiber placement" machines and differ from tape laying machines in that they apply a number of individual fiber tows side-by-side onto a form or tool rather than a pre-formed tape that is reeled with a carrier material. Fiber placement machines include a creel assembly consisting of a number of spools of pre-impregnated fibers, known as towpregs, which are individually fed at independently controlled rates to a fiber placement head. The fiber placement head includes structure for handling each tow individually. This structure is effective to feed the several tows side-by-side to form a fiber band which is pressed onto the surface of the tool by a compaction roller or shoe. The fiber placement head also includes structure for individually cutting one or more of the tows so that they can be "dropped off" from the remaining tows being applied to the tool.

The ability to selectively cut individual tows within the fiber band has a number of advantages. One advantage of selectively cutting individual tows is that the fiber placement head can lay down the tows in an arcuate path. This is because the length of the individual tows can vary since each individual tow is allowed to subtend a different line length compared to adjacent tows forming the fiber band. Another advantage of cutting individual tows is that material savings are obtained in forming tapered parts and the like wherein one or more of the fibers can be "dropped off" or cut as the fiber placement head reaches the ends of the tool to avoid unwanted buildup of fiber thereat. A still further advantage of permitting cutting of each tow individually is that "windows", e.g., holes, cut-outs, etc., formed in the tool can be accommodated by dropping off one or more tows as the fiber placement head moves past so that the windows are uncovered or free of fiber material.

The apparatus disclosed in the McCowin U.S. Pat. No. 4,699,683 provides distinct improvements over tape laying machines because of its capability to independently feed and cut a number of individual fibers which form the fiber band. Nevertheless, a number of limitations have been encountered with the McCowin apparatus, particularly in the construction of its fiber placement head.

One problem with the fiber placement head disclosed in the McCowin U.S. Pat. No. 4,699,683 relates to the mechanisms for cutting and clamping each individual tow in the event it is desired to "drop off" one or more tows from the fiber band. As mentioned above, a number of individual tows are fed at independent rates from a creel assembly to the fiber placement head of the McCowin apparatus. If it is desired to remove one or more of the tows from the side-by-side fiber band, such tows must first be cut and then the cut end must be clamped in place until such time as movement of the cut tow to the compaction roller is resumed. In the McCowin apparatus, a separate knife blade for each individual tow is operatively connected to a cylinder which extends the knife blade to shear the tow, and then retracts the knife blade once the cutting operation is completed. A clamping mechanism is located upstream from the knife blade which is operated by a separate, second cylinder. After the knife blade has cut the tow, the clamping mechanism is operated by the second cylinder to clamp or pinch the tow against a rethread roller.

The problem with the design of the McCowin cut and clamping mechanisms described above is that they operate independently of one another, i.e., one cylinder operates the knife blade and a second cylinder operates the clamping mechanism. As a result, the operation of the two cylinders must be carefully synchronized so that the cutting and clamping operations are performed in sequence and at the appropriate time intervals. This complicates the design and operation of the fiber placement head of the McCowin apparatus.

Another problem with the McCowin fiber placement head is that advancement of the tows to the compaction roller after they have been cut is controlled by rotation of the compaction roller. As mentioned above, once a tow is cut, the clamping mechanism presses the cut end of the tow against a rethread roller which must be rotated to advance or rethread the tow. This rethread roller is drivingly connected to the compaction roller such that the rethread roller is rotated only upon rotation of the compaction roller. As a result, the compaction roller must be in contact with the surface of the tool or form and rotate therealong over at least some distance before the tow is advanced into a position beneath the compaction roller. This causes a delay in returning the cut tow into position, thus resulting in a temporary "drop off" of one tow at a location where such might not be desired.

Another problem with the fiber placement head disclosed in McCowin U.S. Pat. No. 4,699,683 is that it is ineffective to sufficiently cool the individual tows in the course of their movement through the fiber placement head. As mentioned above, the composite tows typically comprise graphite fibers impregnated with an epoxy matrix material. Epoxy and other matrix materials can become "tacky" even at ambient temperatures which makes them difficult to smoothly feed through the fiber placement head. In the McCowin apparatus, a single tube carrying cooling air is positioned a short distance upstream from the compaction roller for the purpose of cooling the tows as they are fed beneath the compaction roller. It is believed that this structure is ineffective to sufficiently cool the tows, particularly where a large number of tows are laid side-by-side to form the fiber band. Additionally, the cooling air is directed onto the tows downstream from the clamping and rethread mechanisms of the fiber placement head in the McCowin apparatus and thus does not ensure the smooth transit of the tows therethrough.

A further limitation of the apparatus disclosed in McCowin U.S. Pat. No. 4,699,683 is that it requires the use of a compaction roller to force the fiber band against the surface of a tool. A compaction roller rotates with the movement of the fiber placement head relative to the tool, and therefore applies little or no shear force to the tows. Such rollers, however, are rigid across their entire width and cannot conform to the surface of the tool. If a surface irregularity, e.g., a convex or concave area, is formed in the tool then the tows may not be firmly pressed against such surface by the roller.

This problem has been addressed in tape laying machines wherein a friction or compaction shoe is substituted for the compaction roller and is capable of conforming to an irregular surface of the tool. These friction shoes are generally constructed of a number of individual sections mounted side-by-side which are vertically movable relative to one another to conform to most shapes. The problem with friction shoes is that they slide along the surface of the tape, and would damage the tows if permitted to directly contact them. The McCowin apparatus provides no means for protecting such tows from frictional engagement with a compaction shoe or similar mechanism, and thus a compaction roller is utilized therein.

SUMMARY OF THE INVENTION

It is therefore among the objectives of this invention to provide a fiber placement machine having a fiber placement head which is compact in design, which ensures reliable synchronization of the cut and clamp operations, which provides for restarting or rethreading of the cut tows independently of the operation of the compaction device, which effectively cools the tows and which permits the use of either a compaction roller or a compaction shoe.

These objectives are accomplished in a fiber placement machine having a fiber placement head which receives a plurality of individual composite tows supplied at independent rates from a creel assembly mounted on the fiber placement machine. The fiber placement head includes a cut, clamp and restart mechanism having identical upper and lower portions, each of which receives a series of parallel, laterally spaced tows. The upper portion of the cut, clamp and restart mechanism includes parallel guides which are staggered or offset from parallel guides in the lower portion thereof so that the tows from the upper portion are laid down side-by-side with the tows from the lower portion forming a substantially continuous fiber band atop the surface of a mandrel beneath a compaction shoe carried by the fiber placement head. Both the upper and lower portions of the cut, clamp and restart mechanism include structure for sequentially cutting and clamping each individual tow and then restarting the movement of such cut tows independently of the movement of the compaction roller or shoe.

In one aspect of this invention, means are provided for cooling each of the individual tows as they enter the cut, clamp and restart mechanism. The upper and lower portions of the cut, clamp and restart mechanism each comprises a number of longitudinally extending, substantially enclosed cooling chutes each having an inlet which receives a tow, an outlet which discharges the tow and a port communicating with a source of cooling air. This cooling air is directed into each of the cooling chutes so that the temperature of every individual tow is reduced before entry into the cut, clamp and restart mechanism so that the matrix material which impregnates the tows does not become tacky as they proceed through the fiber placement head.

In another aspect of this invention, the cutting and clamping operations are performed in sequence and at the proper time intervals by a single cutting and clamping device associated with each individual tow in both the upper and lower portions of the cut, clamp and restart mechanism. Each cutting and clamping device comprises a knife blade carrying a clamping block which is mounted to crank arms operatively connected to a pneumatic cylinder. The knife blade is positioned with respect to a cutting and clamping anvil such that a tow passes therebetween. In response to operation of the cylinder, the knife blade and clamping block are moved in a first direction wherein the knife blade first shears the tow against the face of an anvil and then the clamping block is moved into a position to pinch the cut end of the tow against the anvil. This construction ensures that the cut and clamp operations are performed in proper sequence, and that the cut end of the tow is held in a fixed position relative to the compaction roller or shoe immediately after it is cut.

A further aspect of this invention involves restarting or rethreading the cut tows so that they are advanced to a position beneath the compaction shoe independently of the motion of the compaction shoe. The restart mechanism comprises upper and lower restart shafts each having axially spaced guides which form tow receiving surfaces therebetween. A pinch roller connected by a crank arm to a pneumatic cylinder is provided for each individual tow associated with both the upper and lower portions of the cut, clamp and restart mechanisms. These pinch rollers are each operative in response to activation of the cylinders to engage the cut end of a tow and force it between adjacent guides against the surface of the upper or lower restart shaft. A drive mechanism is provided to continuously rotate the restart shaft so that when a pinch roller forces the cut end of a tow thereagainst, the tow is immediately advanced toward the compaction shoe. Such movement of the cut tows is obtained independently of any motion of the fiber placement head or compaction shoe and thus the cut tows can be directed into place beneath the compaction shoe before the fiber placement head resumes motion.

In a still further aspect of this invention, the fiber placement head is adapted for use with both a compaction roller and a compaction shoe. In the presently preferred embodiment, a compaction shoe is utilized because of its ability to better conform to irregular surfaces on a mandrel or form. In order to use a compaction shoe, the fiber placement head of this invention incorporates means for interposing a protective film between the compaction shoe and the individual tows so that the compaction shoe contacts the film instead of the surface of the tows as they are pressed onto the mandrel.

In the presently preferred embodiment, a supply roller carrying protective film is mounted to the housing of the fiber placement head and feeds the protective film over a pair of idler rollers, into position between the compaction shoe and the tows being laid down on the surface of the mandrel, and then through a capstan drive to a take-up reel. The capstan drive functions to pull the film from the supply roller and beneath the compaction shoe at the same rate as the speed of the tows being laid down on the mandrel. The film protects the tows from direct, sliding contact with the compaction shoe which could damage them, e.g., by gouging or plowing the tows.

In an alternative embodiment, a compaction roller can be utilized by the fiber placement head of this invention for applications in which the mandrel is formed with substantially regular surfaces and the compaction shoe is not required. In this embodiment, the protective film is not utilized because the rotating compaction roller does not impose shear forces on the tows as does the compaction shoe.

The fiber placement head of this invention provides a number of advantages over fiber placement heads of the type disclosed in the McCowin U.S. Pat. No. 4,699,683. In this invention, each of the individual tows is separately cooled along a longitudinally extending cooling chute to ensure that the temperature of such tows is reduced to a level where the matrix material impregnating the tows does not become tacky as the tow passes through the cut, clamp and restart mechanism to the compaction shoe or roller. The cutting and clamping operations are accomplished in a single movement of a knife blade having a clamping block carried thereon to ensure that such operations are performed in sequence and that the cut end of the tow is positively clamped in place immediately after it is cut. Further, the restart mechanism of this invention is operative independently of the movement of the compaction shoe or roller so that cut tows are fed to the compaction roller without first requiring any motion thereof. This ensures that the appropriate number of tows ar always present at the compaction roller as the fiber placement head moves along the mandrel. Finally, the provision of a protective film in the embodiment employing the compaction shoe protects the tows from damage and allows the fiber placement head of this invention to be utilized in applications wherein the mandrel has an irregular surface.

DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE INVENTION

Figure 1:
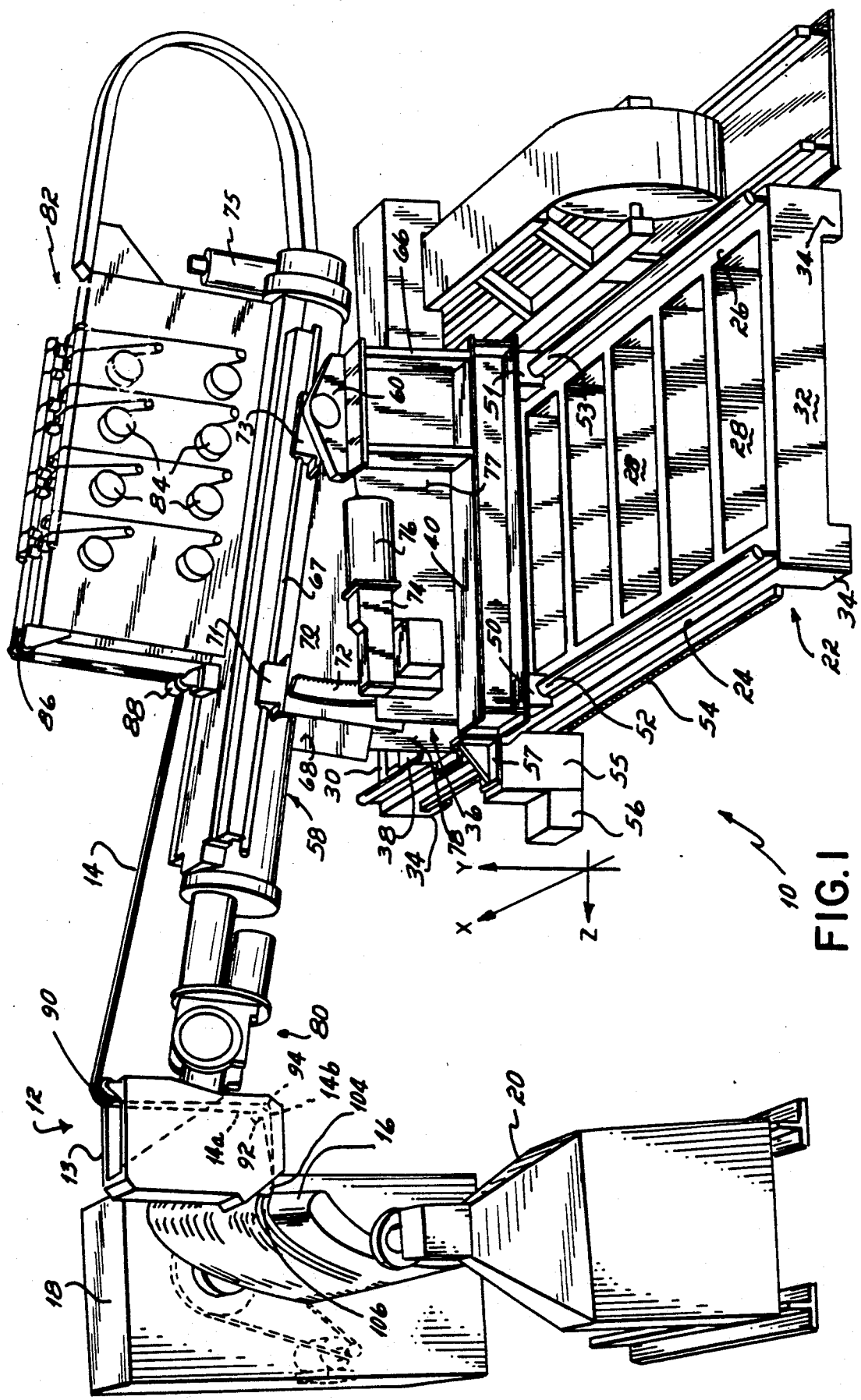
FIG. 1 is a schematic perspective view of a fiber placement machine employing the fiber placement head of this invention.

Referring now to FIG. 1, a perspective view of a fiber placement machine 10 is illustrated which mounts the fiber placement head 12 of this invention in a position to apply composite tows 14 onto a mandrel 16 rotatably carried on a pair of mandrel supports 18, 20. As used herein, the term "tow" is meant to refer to a strand of composite material consisting of a number of fibers preferably impregnated with a binder or matrix material such as epoxy. The detailed construction and operation of the fiber placement machine 10 and mandrel supports 18, 20 form no part of this invention per se, and reference should be made to my co-pending U.S. patent application Ser. No. 07/445,583, filed Dec. 4, 1989, and entitled "Fiber Placement Machine", which is assigned to the same assignee as this invention, for a detailed discussion of same.

For purposes of the present discussion, the fiber placement machine 10 includes a base support 22 having substantially horizontally extending side rails 24, 26 which are interconnected by longitudinally spaced support beams 28. The side rails 24, 26 are connected at opposite ends to end panels 30, 32, each of which is supported by relatively short vertical legs 34.

The base support 22 mounts a carriage 36 which comprises a pair of spaced beams 38, 40 interconnected by rods (not shown). Each of the beams 38, 40 have bearing blocks 50, 51 at opposite ends which slidably engage ways 52, 53, respectively, mounted atop the side rails 24, 26 of base support 22. Movement of the carriage 36 with respect to the base support 22 is effected by a rack and pinion drive. An elongated gear rack 54 is mounted to the underside of side rail 24 of base support 22 which is drivingly connected to a pinion (not shown) mounted to a gear box 55 and motor 56 connected by a support 57 to the carriage 36. Rotation of the pinion by operation of the motor 56 and gear box 55 causes the carriage 36 to move along the gear rack 54 parallel to the longitudinal axis of the base support 22, i.e., along the X axis as depicted in FIG. 1.

A cross slide 58 is pivotally mounted on opposite sides to a pair of bearings 60 each carried atop a vertical column 66, one of which is shown in FIG. 1. The vertical columns 66, in turn, are mounted atop the beams 38, 40. A pair of ways 67 are mounted to the cross slide 58, one of which is shown in FIG. 1, which are carried by forward bushings 71 mounted to a tilt saddle having laterally spaced support plates 68, 70. The rearward end of each way 67 is carried by a bushing 73 connected to each bearing 60. The forward end of each support plate 68, 70 of the tilt saddle mounts an arcuate rack 72, one of which is shown in FIG. 1. Each arcuate rack 72 is drivingly connected to a pinion (not shown) connected to the output of a gear box 74 driven by a motor 76. A first gear box 74 and motor 76 pair is mounted to a side wall 77 connected to beam 40, and a second gear box and motor pair (not shown) is mounted to a side wall 78 connected to beam 38. In response to operation of the motors 76 and gear boxes 74, the pinions drive the arcuate racks 72 to pivot cross slide 58 on the bearings 60 in a substantially vertical direction, i.e., along a Y axis as depicted in FIG. 1. A separate drive (not shown) is also provided to move the cross slide 58 along a Z axis wherein the ways 67 are movable along the bushings 71, 73. Additionally, motor 75 fixed to the rear of the cross slide 58 is drivingly connected by means (not shown) to rotate the fiber placement head 12 about the Z axis.

One end of the cross slide 58 mounts a roll-bend-roll type of robotic wrist 80 which carries the fiber placement head 12. This robotic wrist 80 is commercially available and is effective to move the fiber placement head 12 along a number of axes. Such motion provided by the robotic wrist 80 is in addition to the movement of cross slide 58 along the X axis with carriage 36, the pivotal or tilting movement of cross slide 58 along the Y axis and the cross feed movement of the cross slide 58 along the Z axis, described above. The fiber placement machine 10 is therefore capable of manipulating the position of the fiber placement head 12 along a number of axes with respect to the mandrel 16 and such motions are coordinated with the movement of the mandrel supports 18, 20 by a controller (not shown) as discussed in detail in U.S. patent application Ser. No. 07/445,583.

Figure 2:
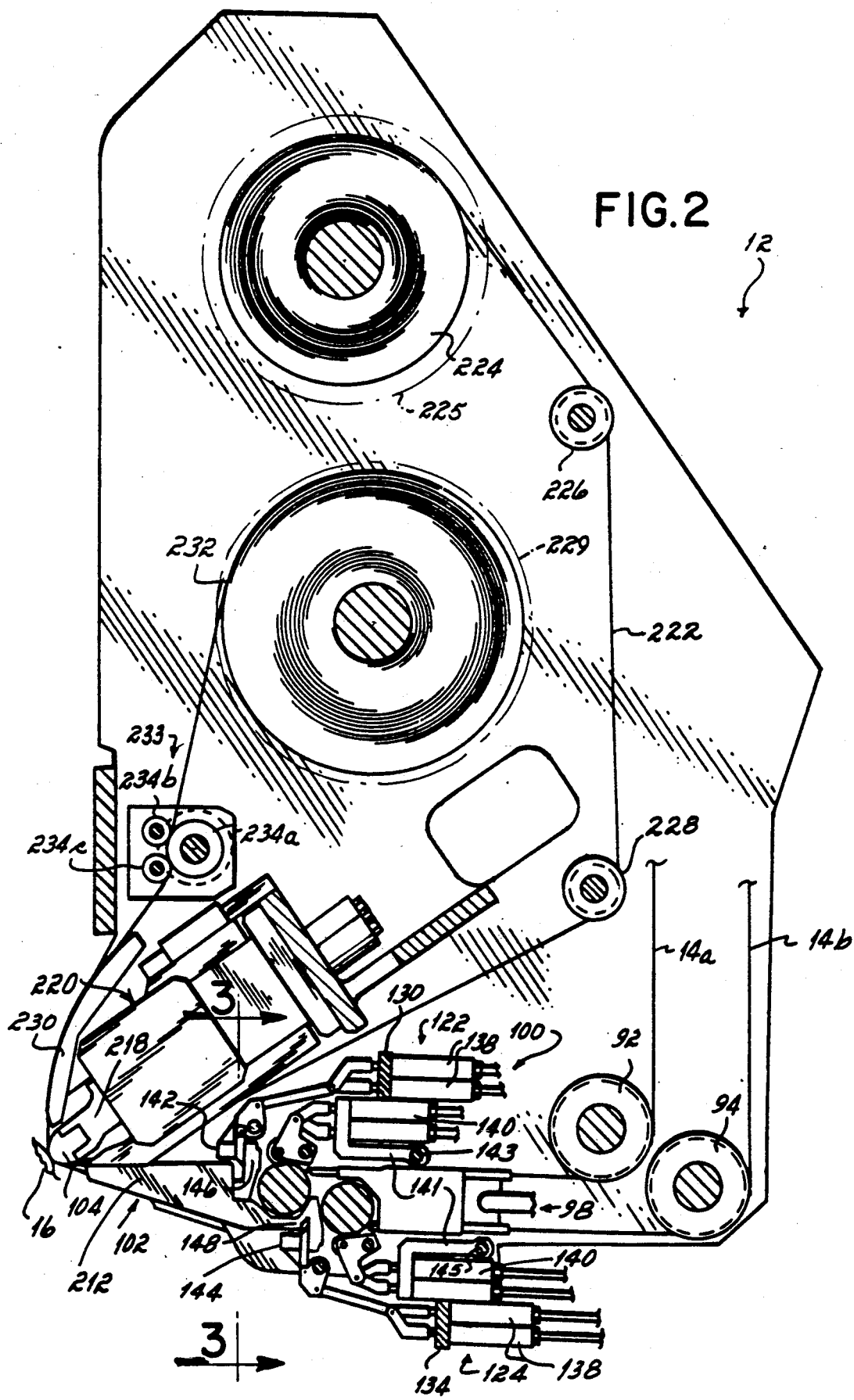
FIG. 2 is a side elevational view in partial cross section of the fiber placement head.

Referring now to FIGS. 1 and 2, the illustrated embodiment of the fiber placement machine 10 is effective to supply a total of sixteen individual composite tows 14 to the fiber placement head 12 for application onto the surface of mandrel 16. The composite tows 14 are supplied from a creel assembly 82 carried on the cross slide 88 which includes eight individual spools 84 on one side and another eight spools (not shown) on the opposite side, each of which supplies a single composite tow 14. These tows 14 are drawn from spools 84 over a fixed roller 86 and a first redirect roller 88 both mounted on the creel assembly 82, and a second redirect roller 90 mounted to the housing 13 of the fiber placement head 12. The purpose of redirect rollers 88 and 90 is to maintain the same relative spatial orientation of the composite tows 14 passing between the fiber placement head 12 and creel assembly 82 as the fiber placement head 12 is manipulated with respect to the mandrel 12 and creel assembly 82. The structure and operation of redirect rollers 88, 90 forms no part of this invention per se and is discussed in detail in U.S. Pat. No. 4,877,193 and entitled "Redirect Roller Apparatus For Fiber Placement Machine" to Vaniglia, and U.S. Pat. No. 4,872,619 and entitled "Servo Driven Redirect Roller Apparatus For Fiber Placement" to Vaniglia, the disclosures of which are incorporated by reference in their entireties herein.

Eight of the composite tows 14 are fed from the redirect roller 90 to an upper idler roller 92 rotatably mounted to the base of fiber placement head 12, and the other eight composite tows 14 are directed from redirect roller 90 to a lower idler roller 94 mounted beneath the upper idler roller 92. The fixed roller 86, redirect rollers 88, 90 and the upper and lower idler rollers 92, 94 all include an individual roller for each tow 14 which are mounted side-by-side and are rotatable relative to one another so that each tow 14 can be fed to the fiber placement head 12 at independent rates from the creel assembly 82.

The composite tows 14 are guided from the upper and lower idler rollers 92, 94 through a cooling assembly 98, a cut, clamp and restart mechanism 100, and then through a guide chute 102 onto the surface of mandrel 16 beneath a compaction shoe 104. As described below, the eight composite tows from the upper idler roller 92 are parallel and laterally spaced from one another forming upper tows 14a, and the eight tows from lower idler roller 94 are parallel and laterally spaced from one another forming lower tows 14b. The upper and lower tows 14a, b are staggered or offset from one another so that upon exiting the guide chute 102, the upper and lower tows 14a, 14b are laid down side-by-side onto the surface of the mandrel 16 forming an essentially continuous fiber band 106 which is pressed against the mandrel 16 by the compaction shoe 104. The detailed construction of each of these features of this invention is described separately below.

Fiber Cooling

Figure 4:
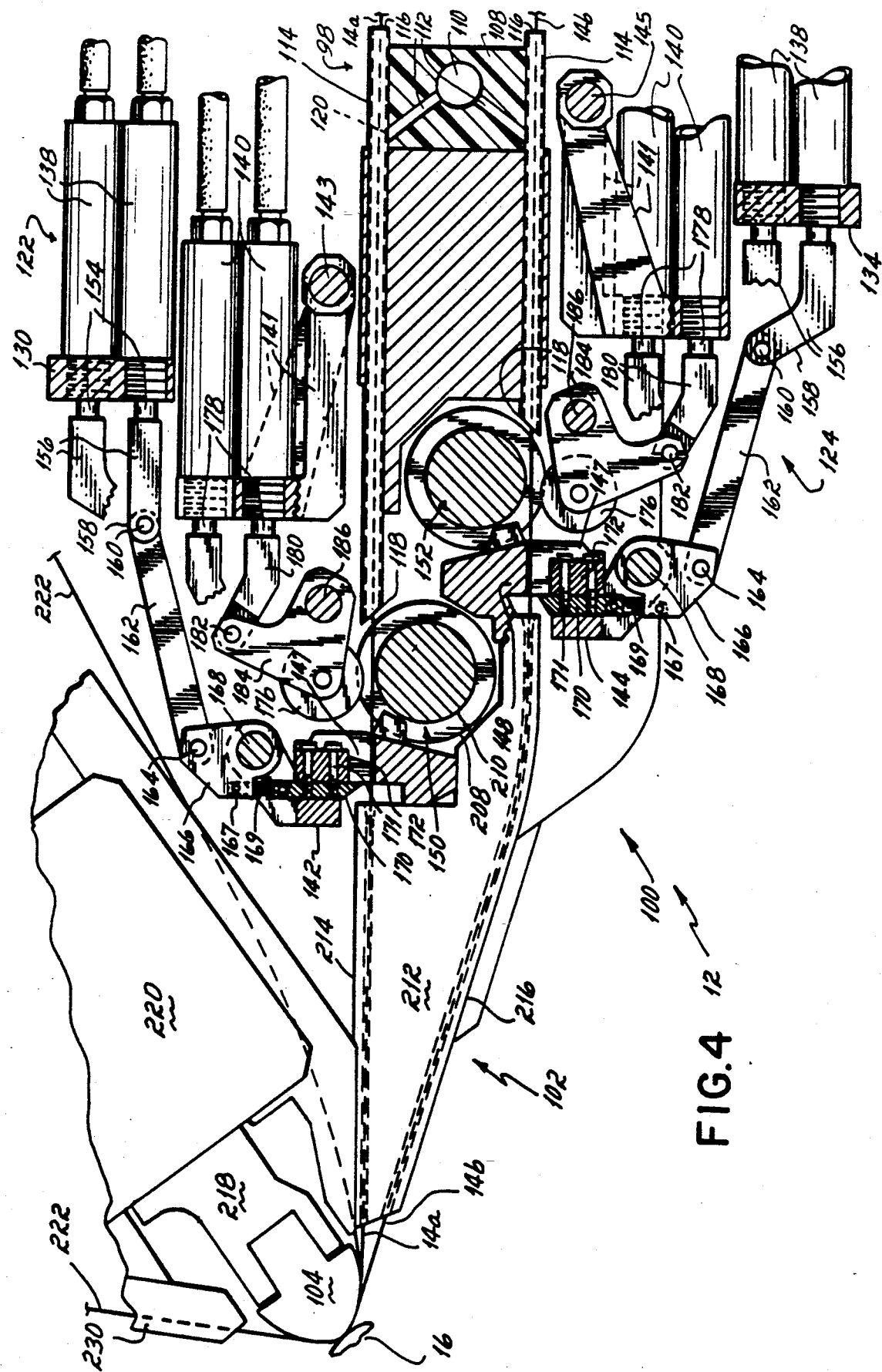
FIG. 4 is a view taken generally along line 4—4 of FIG. 3, in partial cross section, of the cut, clamp and restart mechanism of this invention.

Referring now to FIGS. 2 and 4, the cooling assembly 98 of this invention is illustrated. As mentioned above, the composite tows 14 are preferably formed of a filamentary material such as graphite tows impregnated with a resinous matrix material such as epoxy. Epoxy and similar resins can become tacky under ambient temperature conditions, and it is thus desirable to cool the tows 14a, 14b prior to their entry into the cut, clamp, restart mechanism 100 and guide chute 102.

In the presently preferred embodiment, a cooling block 108 is mounted to the housing 13 of fiber placement head 12 and is formed with a central passage 110 adapted to connect to a source of cooling air or other cooling fluid (not shown), and a plurality of branch passages 112 which intersect central passage 110. An enclosed, substantially rectangular-shaped cooling chute 114 is provided for each of the tows 14a, b having an inlet 116 for receiving the tows, an outlet 118 for discharging them and a port 120. The port 120 of each cooling chute 114 is connected to one of the branch passages 112 for transmitting cooling air into the interior of each cooling chute 114. This cooling air flows from the central passage 110 and branch passages 112 of cooling block 108 into the chutes 114 at a sufficiently low temperature to ensure that the tows 14a, b do not become "tacky" in the course of passage through the cut, clamp, restart mechanism 100 or guide chute 102.

Cut, Clamp and Restart Mechanism

Referring to FIGS. 2-5, the cut, clamp, restart mechanism 100 of this invention is illustrated in detail. The mechanism 100 is essentially modular in construction having an upper assembly 122 to handle upper tows 14a and a lower assembly 124 to handle lower tows 14b. The purpose of the cut, clamp, restart mechanism 100 is to selectively cut or "drop off" individual tows 14a or 14b and allow the remaining tows to continue to the compaction shoe 104 as required during a particular lay-up operation. For example, if an arcuate or crescent-shaped fiber band is to be laid up on the mandrel 16, one or more of the tows 14a or 14b on the inner edge of such fiber band must be dropped off or cut to avoid buckling of the fiber band. Alternatively, in applications such as the formation of a tapered member, it is desirable to eliminate some of the tows at the ends of the tapered member to avoid a build-up thereat. Both of these applications, and others, can be accommodated, by the cut, clamp, restart mechanism 100 of this invention.

Figure 3:
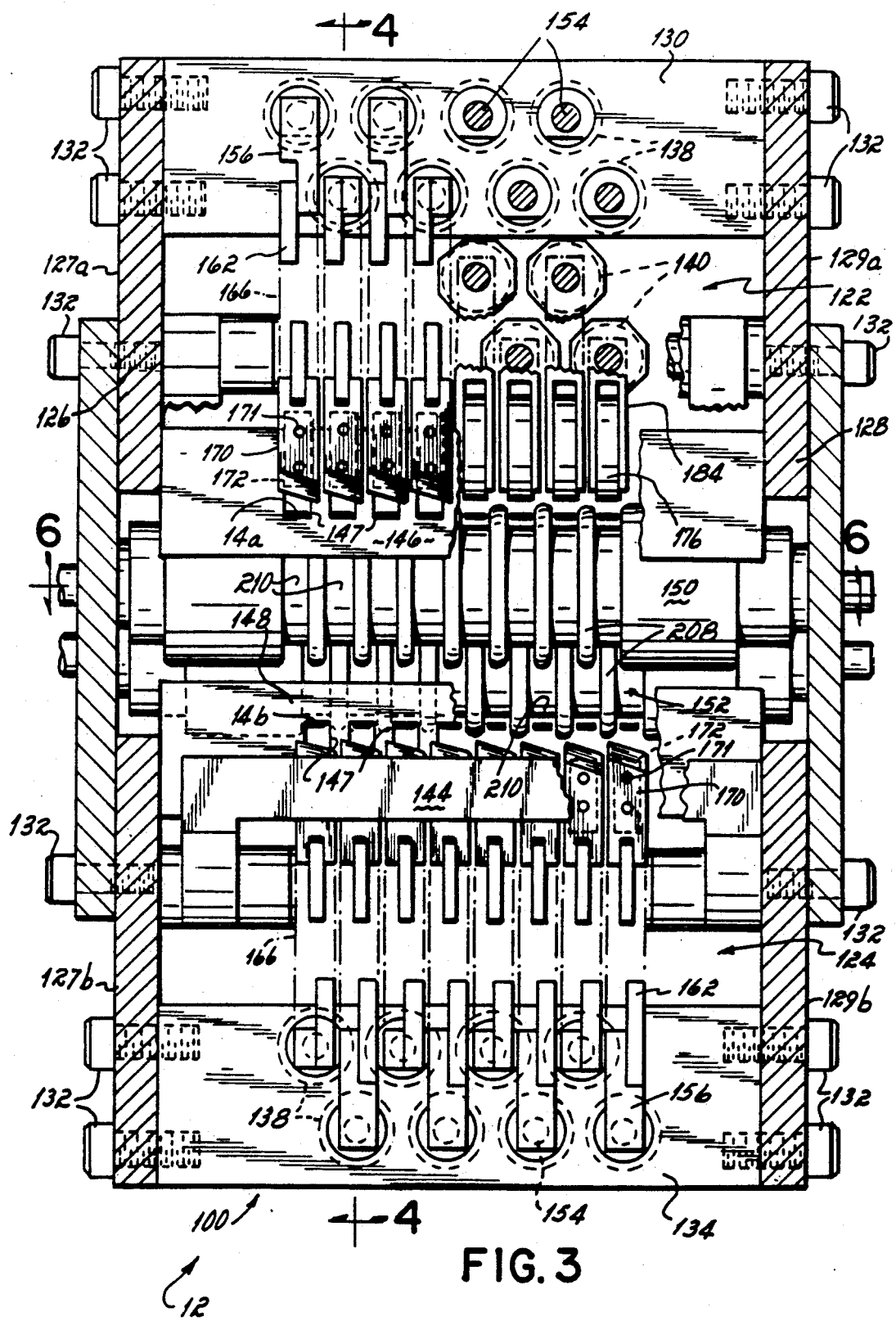
FIG. 3 is a schematic, partially cut-away cross sectional view taken generally along line 3—3 of FIG. 2.

As best shown in FIG. 3, the mechanism 100 comprises a pair of side walls 126 and 128 having mounting brackets (not shown) to mount the mechanism 100 to the housing 13 of fiber placement head 12. The upper and lower assemblies 122, 124 are separate units, each of which is releasably mounted between the side walls 126, 128 to permit removal thereof for cleaning or repair. The upper assembly 122 includes a pair of side plates 127a and 129a which slide between the side walls 126, 128 and are affixed thereto by bolts 132. Similarly, the lower assembly 124 includes side plates 127b, 129b which are connected by bolts 132 between the bottom portion of the side walls 126, 128.

In the presently preferred embodiment, an upper cylinder mounting plate 130 is connected by bolts 132 between the side plates 127a, 129a of upper assembly 122, and a lower cylinder mounting plate 134 is connected between the side plates 127b, 129b of the lower assembly 124 by bolts 132. These upper and lower cylinder mounting plates 130, 134 each mount eight upper and lower cutter and clamping cylinders 138, respectively, which are preferably double acting pneumatic cylinders. As partially shown in FIGS. 3–5, a total of eight upper restart cylinders 140 are mounted by arms 141 to an upper mounting rod 143 extending between side plates 127a, 129a of upper assembly 122, and eight lower restart cylinders 140 are mounted by arms 141 to a lower mounting rod 145 connected between the side plates 127b, 129b of the lower assembly 124. These restart cylinders 140 are preferably single acting-spring return pneumatic cylinders. The side plates of the upper and lower assemblies 122, 124 also mount upper and lower knife retainers 142, 144 and upper and lower cut, clamp and guide anvils 146, 148, respectively. The side walls 126, 128 of mechanism 100 mount upper and lower restart shafts 150, 152.

The construction and operation of the upper and lower knife retainers 142, 144, the cut, clamp and guide anvils 146, 148, restart shafts 150, 152, cutter and clamping cylinders 138 and restart cylinders 140 are essentially identical, with the structural elements of the upper assembly 122 handling the upper tows 14a and the structural elements of the lower assembly 124 handling the lower tows 14b. For purposes of the present discussion, the detailed structure and operation of the upper assembly 122 is described herein and the same reference numbers are applied to the same structure of the lower assembly 124.

Figure 5:
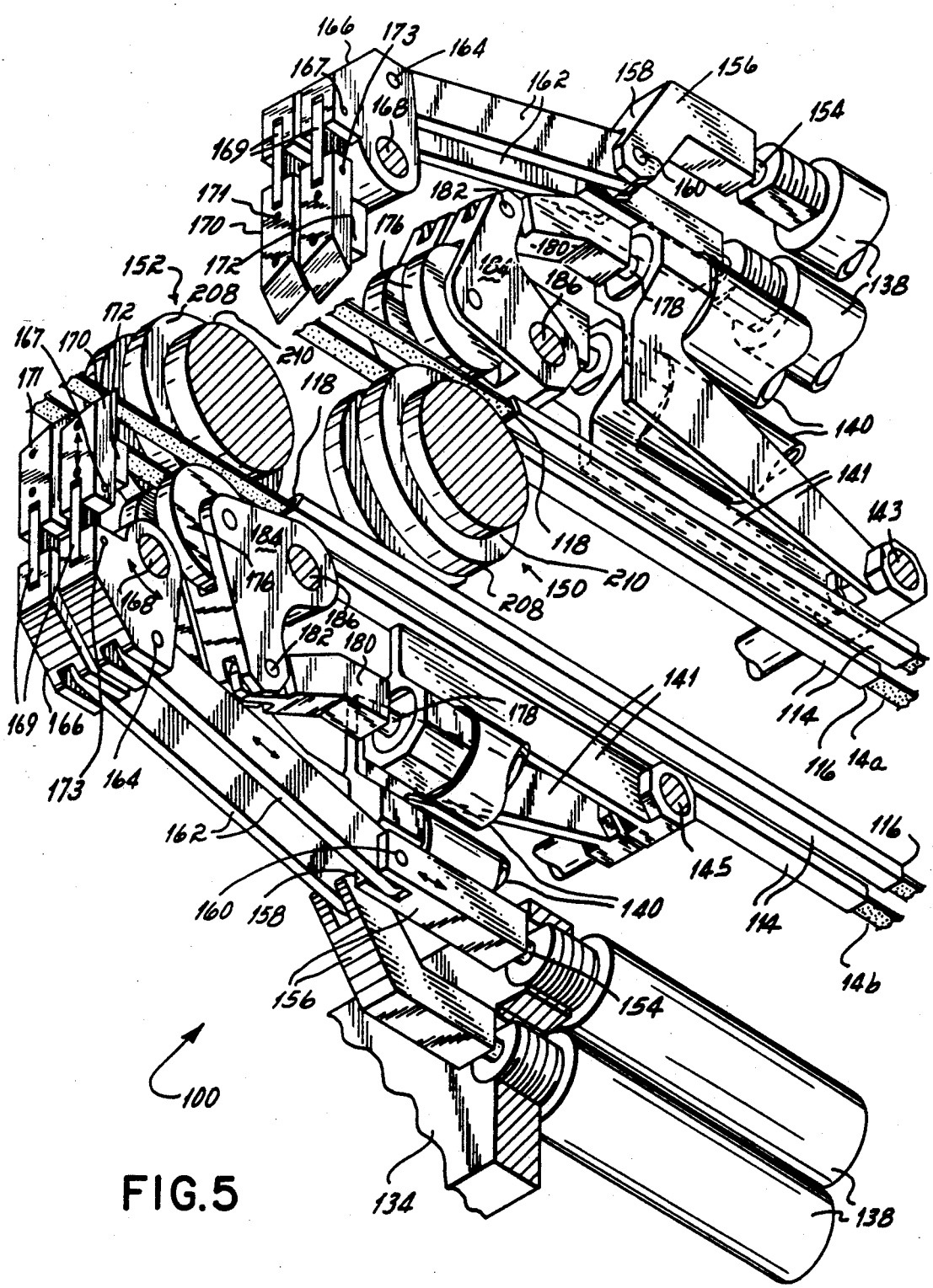
FIG. 5 is an enlarged diagrammatic perspective view of a portion of the cut, clamp and restart mechanism of this invention, certain elements and structure being eliminated for clarity.

Referring now to FIGS. 3–5, the upper cylinder mounting plate 130 carries eight cutter and clamping cylinders 138 each having a piston 154 movable between an extended and retracted position. A first crank arm 156 is mounted to the piston 154 which has a yoke-shaped end 158 connected by a pin 160 to a second crank arm 162. This second crank arm 162 is pivotally connected by a pin 164 to a knife and clamp holder 166. The holder 166 is pivotal with respect to a rod 168 and is connected by a pin 167 at its forward end to a blade link 169. The blade link 169, in turn, is connected by a pin 173 to a knife blade 170 having a cutting edge. A clamping block 172 is fixedly attached by screws 171 to the rearward face of the knife blade 170 and is movable within a slot 147 formed in the cut, clamp and guide anvil 146. See FIG. 3. The knife blade 170 and clamping block 172 are maintained in operative position by the anvil 146 and are vertically movable with respect to an upper composite tow 14a which moves within the base of the slot 147 in the upper anvil 146 beneath the knife blade 170 and clamping block 172.

In response to activation of the cylinder 138 such that its piston 154 is moved to an extended position, the knife blade 170 and clamping block 172 and moved vertically downwardly, as viewed in FIGS. 3–5, by the crank arms 156, 162, the holder 166 and the blade link 169. The knife blade 170 shears the composite tow 14a against the face of the upper anvil 146 and the clamping block 172 clamps the cut end of the composite tow 14a against the upper anvil 146. As best seen in FIGS. 3 and 4, this vertical movement of the knife blade 170 is guided by movement of the clamping block 172 along the slot 147 in the anvil 146 and also by the upper knife retainer 142. Preferably, a 0.002 inch clearance is provided between the retainer 142 and knife blade 170 to ensure no interference therebetween. The knife blade 170 and clamping block 172 are returned to their original position by activation of the cylinder 138 to retract piston 154. The cylinders 138 associated with the lower assembly 124 of cut, clamp and restart mechanism 100 operate in the identical fashion except that the knife blade 170 and clamping block 172 move in a vertically upwardly direction as seen in FIG. 4.

The cylinders 138 maintain the knife blade 170 and clamping block 172 in an extended position, with the clamping block 172 pressing the cut end of tow 14a against the upper anvil 146, until such time as the supply of the cut tow 14a to the compaction shoe 104 is required. A cut tow 14a is restarted or rethreaded to the compaction shoe 104 by operation of the upper restart shaft 150, one of the restart cylinders 140 and one pinch roller 176. As shown in FIGS. 4 and 5, each restart cylinder 140 has a piston 178 connected to a crank arm 180 which is pivotally mounted by a pin 182 to a pinch roller holder 184. This holder 184 is pivotal about a rod 186 and carries a pinch roller 176 in a position immediately above the upper restart shaft 150 so that a tow 14a can pass therebetween.

Figure 6:
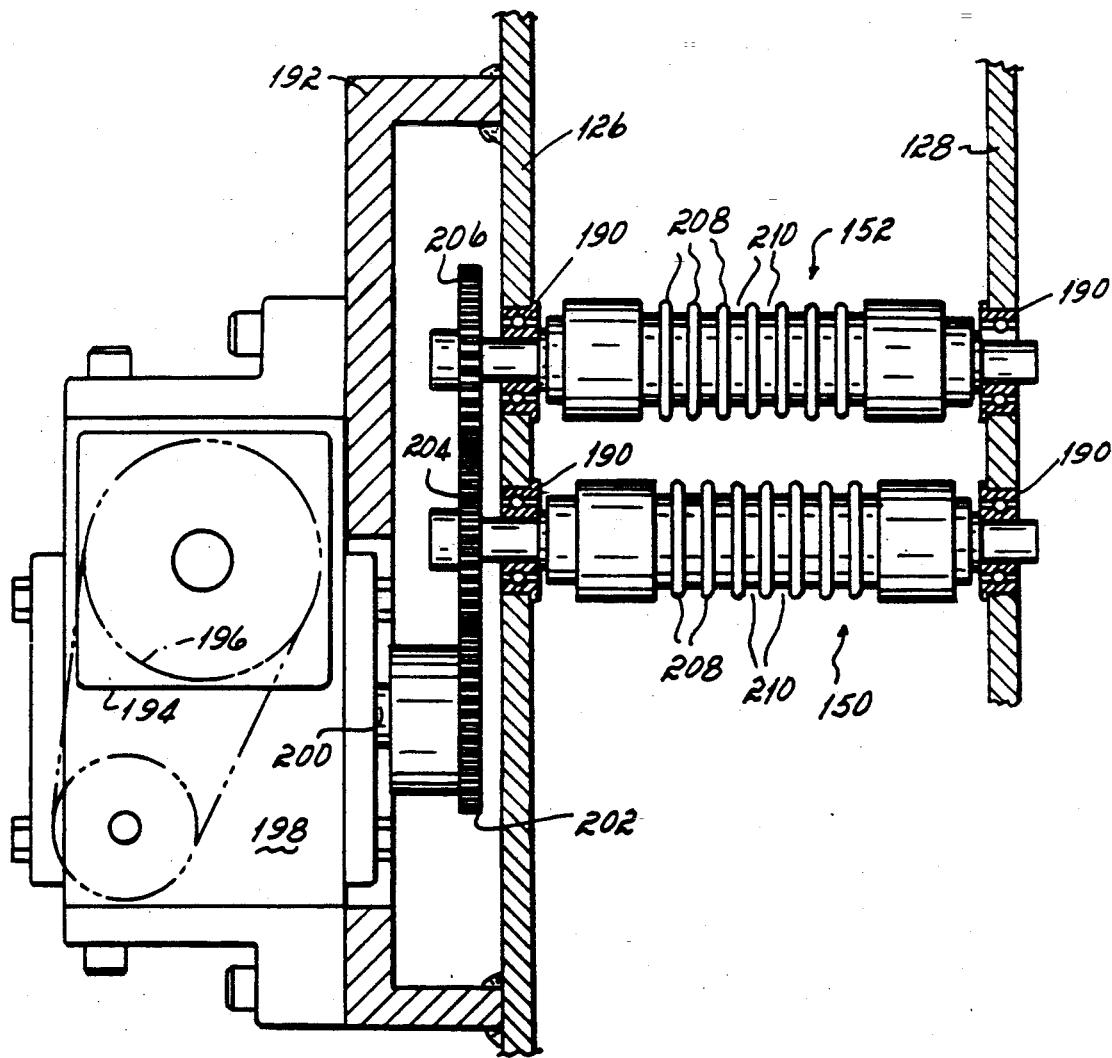
FIG. 6 is a cross sectional view taken generally along line 6—6 of FIG. 3 illustrating the restart shafts and drives therefor.

As best shown in FIG. 6, the upper and lower restart shafts 150, 152 are each rotatably carried on the side walls 126, 128 of the cut, clamp, restart mechanism 100 by bearings 190. A frame 192 connected to the side wall 126 mounts a motor 194 drivingly connected by a pulley 196 to a gear box 198 having a drive shaft 200. This drive shaft 200 carries a drive gear 202 which is drivingly connected to a driven gear 204 carried on one end of the upper restart shaft 150. In turn, the driven gear 204 is drivingly connected to a gear 206 carried on the lower restart shaft 152. The motor 194 is operative to continuously drive the drive gear 202, and thus driven gears 204, 206, such that the upper and lower restart shafts 150, 152 continuously rotate throughout operation of the fiber placement head 12.

As shown in FIG. 6, the upper and lower restart shafts 150, 152 each mount a number of axially spaced guides 208 forming spaces 210 therebetween. The surface of the upper and lower restart shafts 150, 152 in the spaces 210 is preferably covered or formed of a material having a relatively high coefficient of friction. As shown in FIGS. 3 and 6, the spaces 210 of upper restart shaft 150 are axially offset from the spaces 210 of lower restart shaft 152 so that the tows 14a and 14b, respectively, which travel along such shafts 150, 152, are also axially offset from one another. As discussed below, this axial offset of the upper tows 14a and lower tows 14b causes the tows to interleave with one another, i.e., lay down side-by-side, when discharged from the guide chute 102 onto the mandrel 16 beneath the compaction shoe 104 to form the fiber band 106.

Rethreading or restarting of a cut upper tow 14a or lower tow 14b is obtained by movement of the pinch roller 176 with respect to the restart shafts 150 or 152 so that a tow 14a or 14b is pinched against one of the spaces 210 on the continuously rotating restart shafts 150 or 152. In order to move the pinch roller 176, the restart cylinder 140 is first activated to extend its piston 178 causing crank arm 180 to pivot the holder 184 about rod 186. This pivots the pinch roller 176 downwardly as viewed in FIGS. 4 and 5 so that the pinch roller 176 extends between adjacent guides 208 into the space 210 therebetween. In turn, a composite tow 14a is pressed against the restart shaft 150 within the space 210 and the rotation of the restart shaft 150 advances the composite tow 14a into the guide chute 102 to the compaction shoe 104. When the tow 14a is in position relative to the compaction shoe 104, the restart cylinder 140 retracts its piston 178 to move the pinch roller 188 out of contact with the restart shaft 150.

An important advantage of this construction is that the restart cylinder 140 and pinch roller 176 are activated to restart or rethread the composite tow 14a independently of the movement of the compaction shoe 104. The upper and lower restart shafts 150, 152 are continuously rotating and the restart cylinders 140 are activated as desired to effect the rethreading or restart operation. The lower composite tows 14b are advanced to the compaction shoe 104 in the identical manner as composite tows 14a described above except that the pinch rollers 176 associated with the lower portion 124 of the cut, clamp and restart mechanism 100 are movable in a generally vertically upward direction as seen in FIGS. 4 and 5.

Fiber Placement

Referring now to FIGS. 2 and 4, the structure for pressing or compacting the composite tows 14a, 14b onto the surface of mandrel 16 is illustrated. As mentioned above, eight upper tows 14a and eight lower tows 14b are fed through the cut, clamp and restart mechanism 100 to the guide chute 102, and selected tows 14a or 14b can be "dropped off" of cut, as desired, depending upon the requirements of a particular lay-up application. The guide chute 102 is essentially a block 212 having eight longitudinally extending grooves (not shown) on its upper surface to receive the upper tows 14a, and eight longitudinally extending grooves on its lower surface to receive the lower tows 14b. These grooves are enclosed by an upper cover plate 214 and lower cover plate 216. The eight upper tows 14a are deposited by the guide chute 102 parallel to one another and offset from the eight lower tows 14b so that the fiber band 106 is formed on the mandrel 16 consisting of the tows 14a, 14b laid down side-by-side. See FIG. 1.

In the presently preferred embodiment shown in FIG. 2, the compaction shoe 104 is mounted by segments 218 to the housing 13 of fiber placement head 12, through the mechanism of a shoe segment assembly 220. The assembly 220 will be discussed in detail in connection with FIGS. 8 through 12.

Film System

The compaction shoe 104 slides along the surface of mandrel 16 and it is necessary to protect the composite fiber band 106 against direct frictional engagement with the compaction shoe 104. This is accomplished in the fiber placement head 12 of this invention by the provision of a protective film 222 which is interposed between the compaction shoe 104 and fiber band 106. The film 222 is supplied from a supply reel 114 having a brake 225 carried by the housing 13 of fiber placement head 12, and is directed over the idler rollers 226,228 to a location between the compaction shoe 104 and fiber band 106. The film 222 is directed from the compaction shoe 104 through a film take-up chute 230 to a take-up reel 232 having a clutch 229 also carried by the housing 13 of fiber placement head 12.

In the presently preferred embodiment, the film 222 is drawn from the supply reel 224 by a capstan drive 233 mounted to the housing 13 of fiber placement head 12 having a drive roller 234a drivingly connected to a servo-motor 235 and a pair of pressure rollers 234b,c. The drive roller 234a is connected by a belt (not shown) to the clutch 229 of take-up reel 232. The capstan drive 233 is effective to pull the film 222 from the supply reel 224 at the same rate at which the tows 14a,b are laid down onto the mandrel 16 so that there is essentially no relative movement between the film 222 and tows 14a,b.

Figure 7:
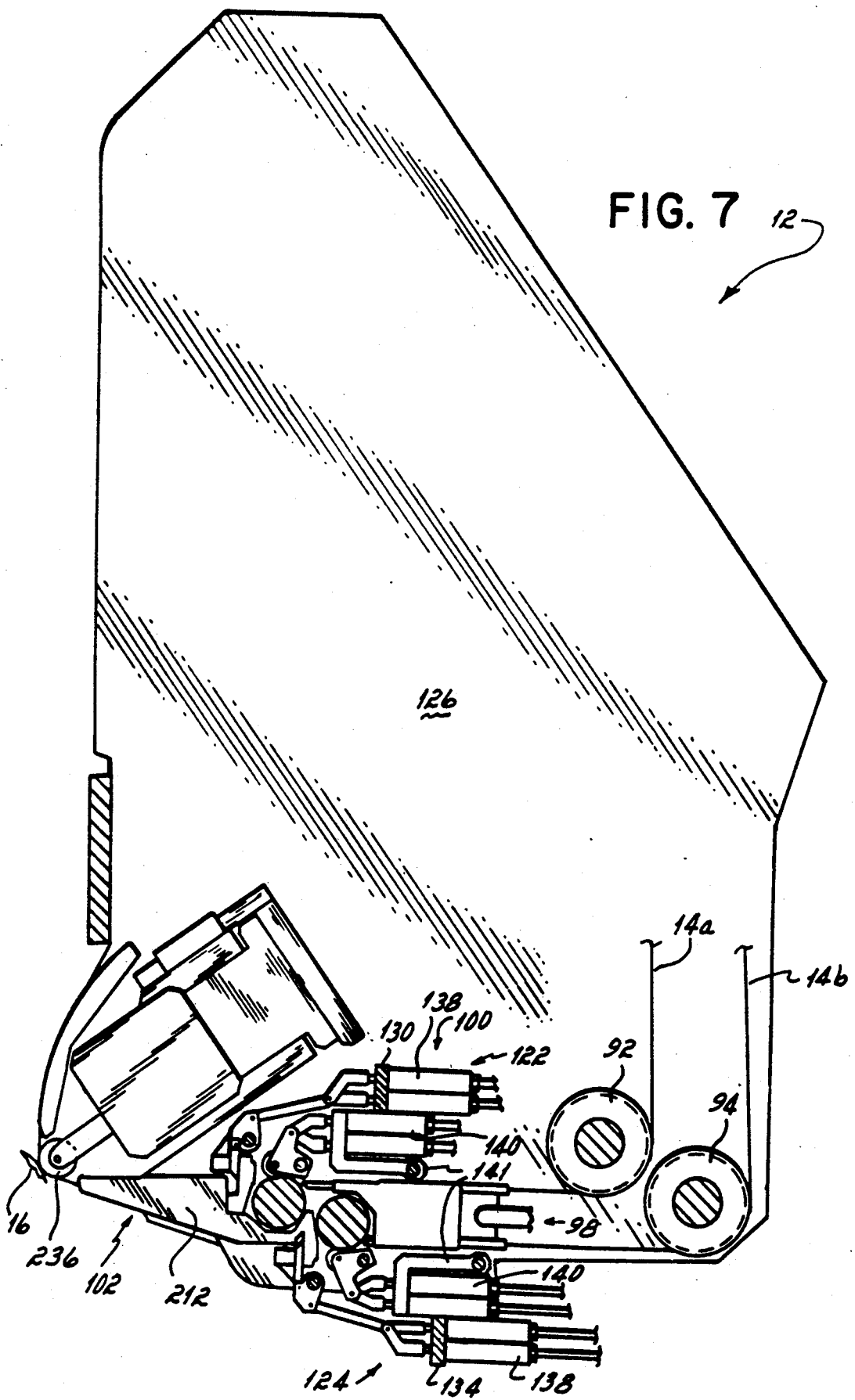
FIG. 7 is a view similar to FIG. 2 of an alternative embodiment of this invention which employs a compaction roller.

Referring to FIG. 7, an alternative embodiment of this invention is illustrated which is similar to that disclosed in FIG. 2, except the compaction shoe 104 is replaced with a compliant compaction roller 236 held at its ends by a yoke assembly. The compaction roller 236 is rotatable with respect to the surface of mandrel 16 as the fiber placement head 12 is moved therealong which substantially eliminates any sliding or shearing engagement with the fiber band 106. As a result, the compaction roller 236 is permitted to contact the fiber band 106 directly, thus eliminating the need for the protective film 222. It is contemplated that the compaction roller 236 in the embodiment of FIG. 9 would be useful in lay-up applications where the mandrel 16 has little or no surface irregularities.

For other applications, it may be desirable to adapt the segmented roller and shoe assemblies of U.S. Pat. No. 4,869,774, entitled "Compliant Presser Member For Fiber Placement Machine", the disclosure of which is incorporated by reference in its entirety herein.

Shoe Segment Assembly

Figure 8:
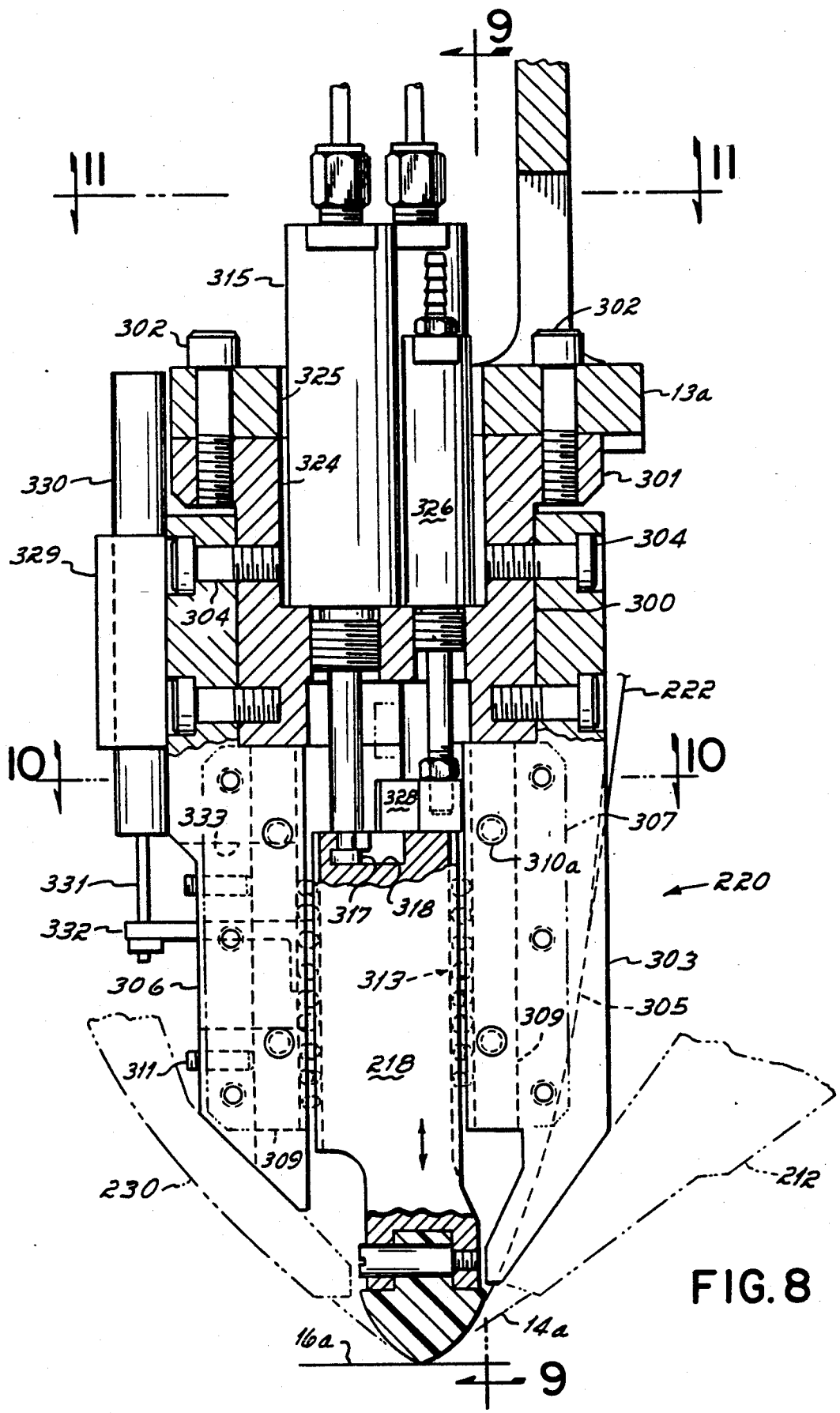
FIG. 8 is an enlarged side view, in partial section, of the shoe segment assembly of FIG. 2.

FIG. 2 shows the shoe segment assembly 220 mounted to a cross rib 13a of the fiber placement head housing 13. Referring to FIG. 8, the shoe segment assembly 220 has been oriented for convenient viewing, and is shown in isolation, affixed to the cross rib 13a of the housing 13. A generally rectangular main support block 300 of the assembly 200 has a flange 301 around its periphery which is tapped to receive screws 302 extending through the rib 13a.

Here it may be noted that, in FIG. 8, the shoe segment assembly 220 would move in a rightward direction, relative to a laydown surface 16a, when placing fiber tows 14a to the surface 16a. Therefore, the right-hand face of the assembly 220 may be referred to as the "front" for convenience of reference, and the lefthand face may be referred to as the "rear". With that definition in mind, a front way support 303 extends towards the laydown surface 16a, the support 303 being secured to the support block 300 by cap screws 304, and having a portion of its outer surface machined away to provide a guide chute 305 for the film 222. In a similar manner, a rear way support 306 extends from the main support block 300 and is secured by cap screws 304.

Figure 9:
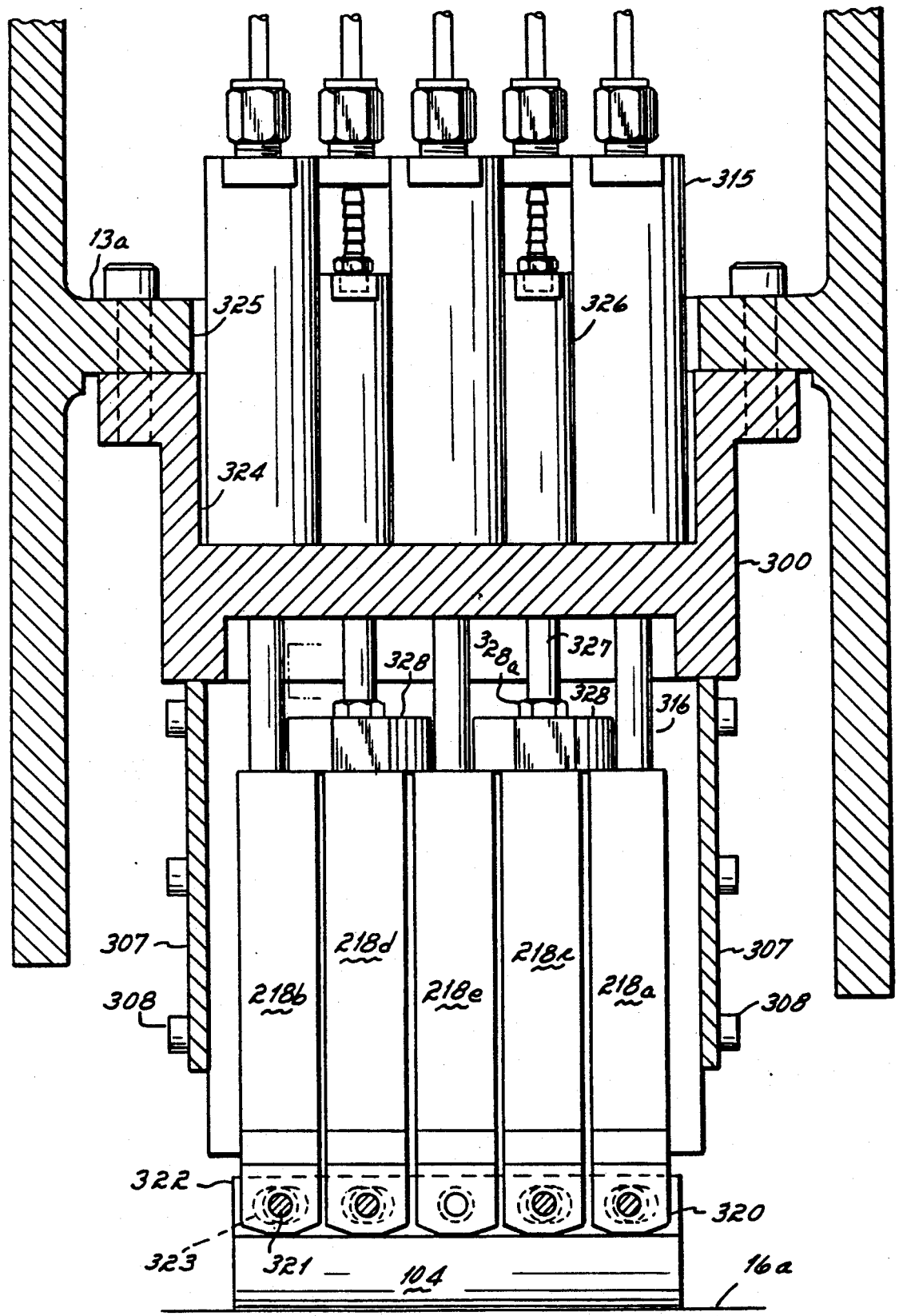
FIG. 9 is an elevational section through the shoe segment assembly, taken along the line 9—9 of FIG. 8.
Figure 10:
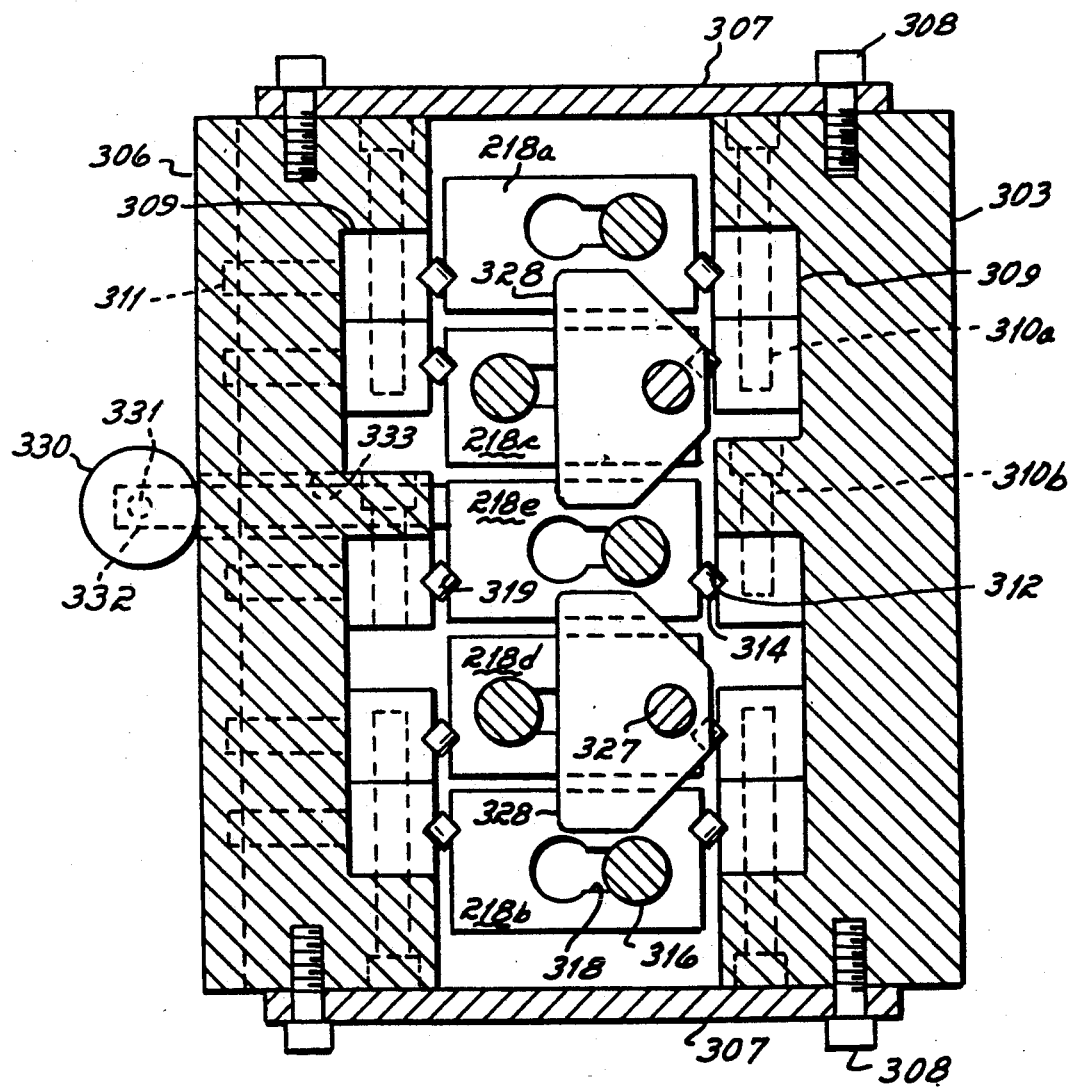
FIG. 10 is a plan section through the shoe segment assembly, taken along the line 10—10 of FIG. 8.
Figure 11:
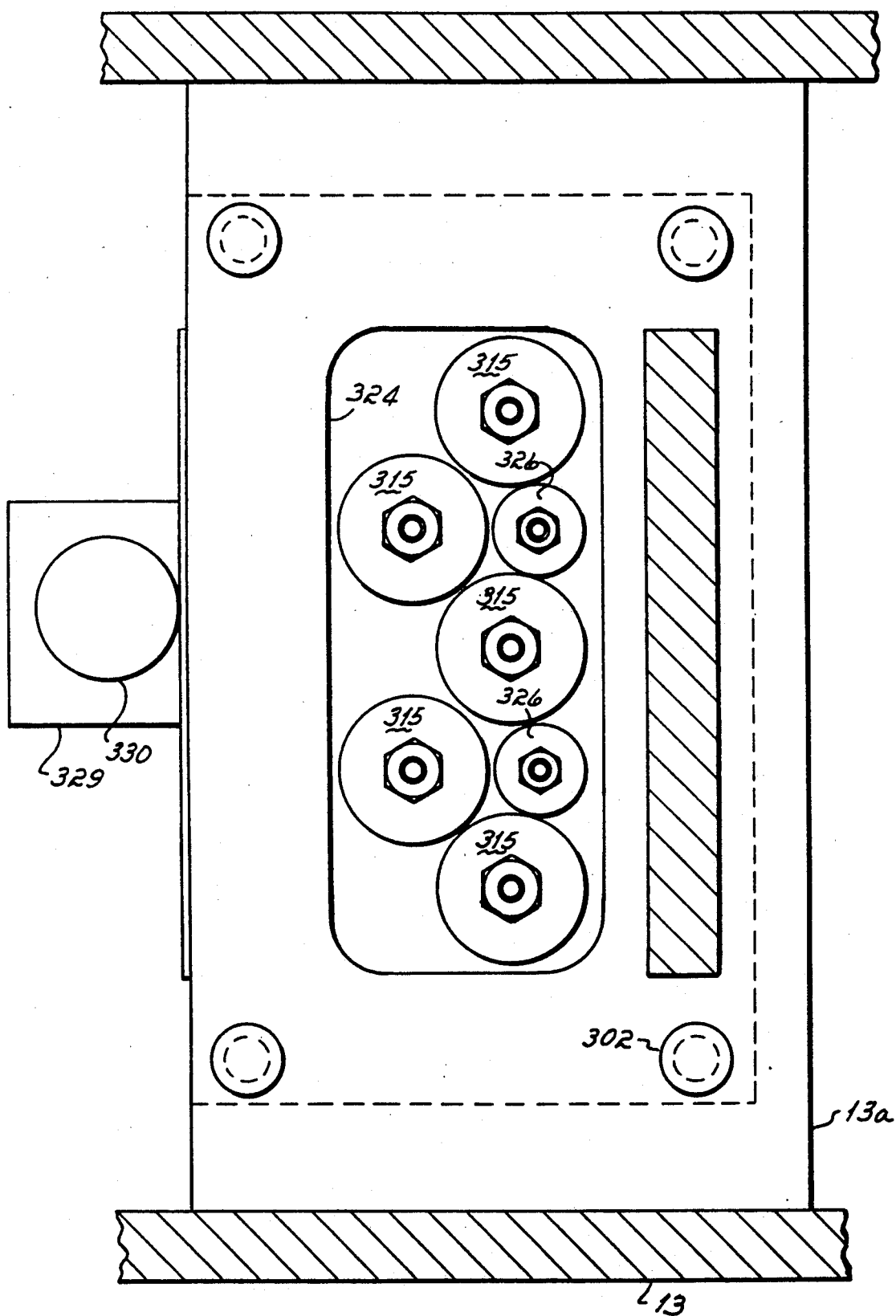
FIG. 11 is a plan view of the shoe segment assembly, taken along the line 11—11 of FIG. 8.

Both ways supports 303,306 are subtended by side covers 307, (removed from FIG. 8 for purposes of clarity), and the side covers 307 are secured to the way supports 303,306 by a plurality of cap screws 308 (see FIGS. 9 and 10). The way supports 303,306 each carry an equal number of parallel linear ways 309 (see FIGS. 8 and 10) which are affixed by cap screws 310a,b. The ways 309 have a precision V-groove 312 forming a linear raceway for a roller bearing assembly 313 which is well-known in machine design art. The roller bearing assemblies 313 have nearly-square-profile rollers 314 which are alternately disposed with crossed axes to provide radial thrust support in two directions. The ways 309 mounted to the rear way support 306 are backed-up with adjusting set screws 311 to remove any shake from the assembly 313. The ways 309 serve to guide plural shoe segments 318 which are affixed to the compaction shoe 104. The segments 218 may be varied to accommodate differing widths of shoes and, in this case, five segments 218 are employed to assist the compaction shoe 104 in conforming to contours across its width.

Referring to FIGS. 8, 9, and 10, there are two outer segments 218a,b, two inner segments 218c,d, and a center segment 218e, which are powered by identical actuating cylinders 315. The piston rods 316 of the cylinders 315 are formed with a head 317 which is captivated in a key slot 318 of a respective segment 218 in a well-known manner. With reference to the plan view of FIG. 11, it can be seen that the actuating cylinders 315 are staggered in spacing, to a row of two and a row of three to create a close packing density and, therefore, the segments 218a-e differ slightly in the locations of respective V-grooves 319 and keyslots 318, to accommodate the packing array. In the preferred embodiment, the cylinders 315 used are single-acting with spring-return, where air from a supply source (see FIG. 12) is introduced to power the segments 218 toward the laydown surface 16a; consequently, removal of the applying pressure will cause retraction of the segments 218 from the laydown surface 16a. The segments 218a-e each have a bifurcated end 320, opposite to the keyslot end, which is provided with a threadably-secured cross pin 321 to form a clevis joint with a tongue portion 322 of the compaction shoe 104.

Referring to FIG. 9, the tongue portion 322 of the compaction shoe 104 has slots 323 around the pins 321 at the inner and outer segments 218a-d to allow the shoe 104 to freely flex with surface contour changes. The actuating cylinders 315 are threadably received in the support block 300, within a deep relief 324 machined in the block corresponding with an aperture 325 cut through the cross rib 13a.

A pair of small null cylinders 326 are fitted between three of the actuating cylinders 315 in accordance with the pattern of FIG. 11, again to maintain close packing density, and the null cylinders 326 are also threadably received with the support block 300. The piston rod 327 of each null cylinder 326 carries a threadably-received null block 328, secured with a jam nut 328a, and it is the purpose of the null cylinders 326 and blocks 328 to provide a reference position or null plane, for the segments 218a-e. Upon energization of a common solenoid valve, both null cylinders 326 will fire the blocks 328 to a common level, and, as pressure is relieved from the segment actuating cylinders 315, the segments 218a-e will be spring-biased against the null blocks 328, as shown in FIGS. 8 and 9. Thus, the compaction shoe 104 can be taken to a repeatable null position for programming and alignment purposes. The null cylinders 326 are single-acting, spring-return, so that, in absence of the energization pressure, the null blocks 328 will be moved away from proximity with the segments 218a-e. To indicate that null position has been reached, the rear way support 306 carries a clamp 329 which secures a linear transducer 330 capable of producing a signal. The transducer 330 has a core 331 relatively movable in parallel with the ways 309, and a small bracket 332 extending through an aperture 333 cut in the rear way support 306 is affixed to both the center segment 218e and the core 331 (see FIGS. 8 and 10). The sectional view of FIG. 9 shows the array of cylinders 315 and segments 218a-e, with the null blocks 328 fired to the null position (way details have been omitted for clarity).

Figure 12:
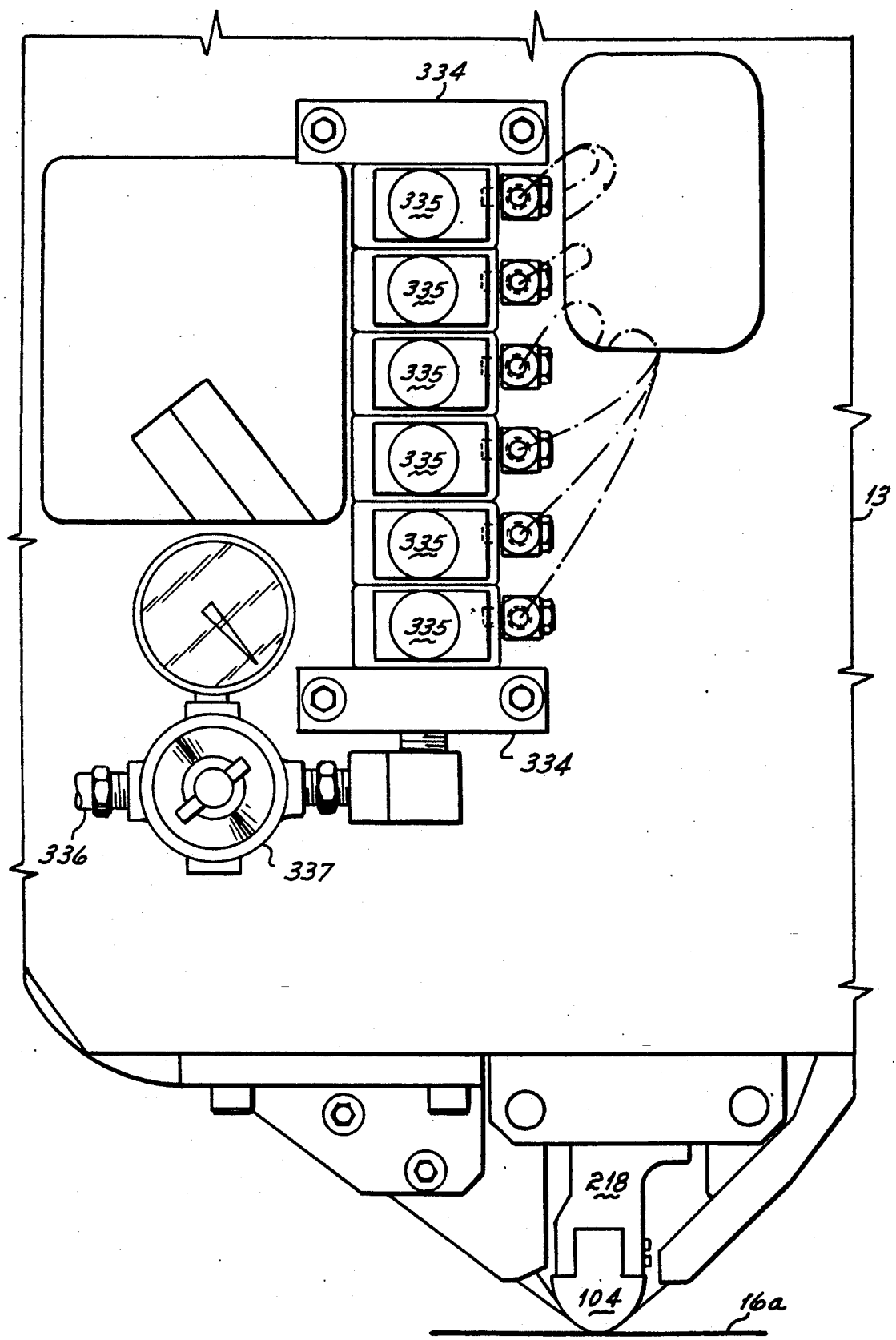
FIG. 12 is a side elevational view of the fiber placement head illustrating control valves for the shoe segment assembly.

FIG. 12 is a view of the fiber placement head 12, showing the side opposite to that shown in FIG. 1, where a pair of brackets 334 fixed to the housing 13 support a bank of solenoid-operated air valves 335. The valves 335 are fed from a common supply line 336 through a pressure regulator 337. Five air valves 335 provide independent supplies to the five segment actuating cylinders 315, and the remaining air valve 335 is a common supply to the twin null cylinders 326.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, the cut, clamp and restart mechanism 100 illustrated in the FIGS. is designed to accommodate up to eight upper tows 14a and eight lower tows 14b. It should be understood that essentially any number of composite tows could be laid down by the apparatus of this invention, as desired, and the handling of band consisting of a total of sixteen tows has been described for purposes of illustration only.

Therefore, it is intended that the invention not be limited to the particular embodiment disclosed as the best mode contemplated for carrying out this invention, but the invention will include all embodiments falling within the scope of the appended claims.

I claim:

1. A fiber placement head for applying composite fiber tows onto a surface, comprising:
    a fiber compaction device;
    guide means for guiding a number of individual fiber tows supplied at independent rates from a fiber tow source to a location beneath said fiber compaction device, said guide means being effective to orient the individual fiber tows side-by-side to form a fiber band which is pressed against the surface by said fiber compaction device;
    cutting means associated with each of the individual fiber tows for selectively and independently cutting the fiber tows to form a cut end;
    clamping means associated with each of the fiber tows and operative in response to actuation of said cutting means for individually and independently clamping the cut end of one of the fiber tows in a fixed position relative to said fiber compaction device after each of the fiber tows is cut by one of said cutting means.

2. The fiber placement head of claim 1 in which said cutting means comprises:
    a knife blade, said knife blade carrying said clamping means;
    an anvil positioned relative to said knife blade so that the fiber tow moves therebetween;
    means for moving said knife blade against said anvil to cut the fiber tow forming a cut end and to move said clamping means into position to clamp said cut end of the fiber tow against said anvil.

3. The fiber placement head of claim 2 in which said means for moving said knife blade comprises:

a knife blade holder carrying said knife blade;
a cylinder having a reciprocating piston; and
linkage means interconnecting said knife blade holder and said piston for moving said knife blade and said clamping means in a first direction to cut and clamp the fiber tow against said anvil upon extension of said piston, and for moving said knife blade and said clamping block in a second direction to release the fiber tow upon retraction of said piston.

4. The fiber placement head of claim 2 in which said knife blade has a cutting edge, said clamping means comprising a clamping block mounted to said knife blade in a position such that said cutting edge of said knife blade cuts the fiber tow before said clamping block clamps the fiber tow against said anvil.

5. A fiber placement head for applying composite fiber tow onto a surface, comprising:
a fiber compaction device;
guide means for guiding a number of individual fiber tows supplied at independent rates from a fiber source to a location beneath said fiber compaction device, said guide means being effective to orient the individual fiber tows side-by-side to form an essentially continuous fiber band which is pressed against the surface by movement of said fiber compaction device thereagainst;
cutting means associated with each of the individual fiber tows for selectively cutting the fiber tows to form a cut fiber;
a clamping device associated with each of the individual fiber tows, each of said clamping devices being movable between a clamping position in which a cut fiber tow is clamped in a fixed position relative to said fiber compaction device after cutting by said cutting means, and a release position in which the cut fiber tow is released to permit movement thereof to said fiber compaction device;
restart means associated with each of the individual fiber tows for feeding a cut fiber tow to said fiber compaction device independently of the movement of said fiber compaction device upon release of the cut fiber tow by said clamping device.

6. The fiber placement head of claim 5 in which said restart means comprises:
a restart shaft;
means for continuously rotating said restart shaft;
a pinch roller associated with each of the individual fiber tows, each said pinch rollers being located with respect to said restart shaft so that a fiber tow passes therebetween;
means for moving said pinch roller with respect to said restart shaft to pinch a cut fiber tow therebetween, said rotation of said restart shaft being effective to drivingly advance a cut fiber tow pinched between said pinch roller and said restart shaft to said fiber compaction device.

7. The fiber placement head of claim 6 in which said restart shaft includes a number of axially spaced guides and a surface between each of said guides having a relatively high coefficient of friction, the cut fiber tows being pressed against said surfaces by said pinch rollers to effect movement of the cut fiber tows to said fiber compaction device.

8. The fiber placement head of claim 6 in which said means for moving each said pinch roller comprises:
a holder carrying said pinch roller;
a cylinder having a piston;
means interconnecting said holder and said piston for moving said pinch roller in a first direction upon extension of said piston so that a cut fiber tow is pressed against said restart shaft, and for moving said pinch roller in a second direction to disengage said restart shaft upon retraction of said piston.

9. A fiber placement head for applying composite fiber tows onto a surface, comprising:
a fiber compaction device;
guide means for guiding a number of individual fiber tows supplied at independent rates from a fiber tow source to a location beneath said fiber compaction device, said guide means being effective to orient the individual fiber tows side-by-side to form a fiber band;
means for interposing a protective film between said fiber compaction device and said fiber band so that said fiber compaction device contacts said protective film and presses said fiber band against the surface without damaging said fiber band;
cutting means associated with each of the individual fiber tows for selectively cutting the fiber tows to form a cut fiber tow;
clamping means operatively associated with said cutting means for clamping a cut fiber tow in a fixed position relative to said fiber compaction device after the fiber tows are cut, and for subsequently releasing the cut fiber tows;
restart means associated with each of the individual fiber tows for feeding a cut fiber tow to said fiber compaction device independently of the movement of said fiber compaction device upon release of the cut fiber tows by said clamping means;
a cooling chute associated with each of the individual fiber tows, each of said cooling chutes receiving one of the fiber tows and directing cooling fluid thereon to lower the temperature of the fiber tows.

10. The fiber placement head of claim 9 in which said cutting means comprises:
a knife blade, said knife blade carrying said clamping means;
an anvil positioned relative to said knife blade so that the fiber tow moves therebetween;
means for moving said knife blade against said anvil to cut the fiber tow forming a cut end and to move said clamping means into position to clamp said cut end of the fiber tow against said anvil.

11. The fiber placement head of claim 9 in which said restart means comprises:
a restart shaft;
means for continuously rotating said restart shaft;
a pinch roller associated with each of the individual fiber tows, each said pinch rollers being located with respect to said restart shaft so that a fiber tow passes therebetween;
means for moving said pinch roller with respect to said restart shaft to pinch a cut fiber tow therebetween, said rotation of said restart shaft being effective to drivingly advance a cut fiber tow pinched between said pinch roller and said restart shaft to said fiber compaction device.

12. The fiber placement head of claim 9 in which said means for interposing a protective film between said fiber compaction device and said fiber band comprises:
a supply roller for dispensing protective film;
a take-up roller for receiving protective film;
drive means for pulling the protective film from said supply roller and directing the protective film between said fiber compaction device and said fiber band at a rate substantially equal to the rate at which the fiber band is deposited onto the surface.

13. The fiber placement head of claim 9 in which each of said cooling chutes defines a substantially enclosed passageway formed with an inlet to receive a fiber tow, an outlet to discharge the fiber tow and a port located between said inlet and outlet.

14. The fiber placement head of claim 13 in which said means for directing cooling fluid into each of said cooling chutes comprises a distribution block having a central passage adapted to connect to a source of cooling fluid and a number of branch passages, each of said branch passages being connected between said central passage and one of said ports in said cooling chutes to transmit cooling fluid into said cooling chutes.

* * * * *